(No Model.) 2 Sheets—Sheet 1.

J. P. WILSON.
SORTING MACHINE FOR PEACHES, &c.

No. 581,321. Patented Apr. 27, 1897.

WITNESSES:
Edward Thorpe
Fred Acker

INVENTOR
J. P. Wilson
BY
ATTORNEYS.

(No Model.)  2 Sheets—Sheet 2.

J. P. WILSON.
SORTING MACHINE FOR PEACHES, &c.

No. 581,321. Patented Apr. 27, 1897.

WITNESSES:
Edward Thorpe

INVENTOR
J. P. Wilson.
BY
ATTORNEYS.

UNITED STATES PATENT OFFICE.

JOHN P. WILSON, OF HAMBURG, NEW JERSEY.

SORTING-MACHINE FOR PEACHES, &c.

SPECIFICATION forming part of Letters Patent No. 581,321, dated April 27, 1897.

Application filed April 25, 1896. Serial No. 589,053. (No model.)

*To all whom it may concern:*

Be it known that I, JOHN P. WILSON, of Hamburg, in the county of Sussex and State of New Jersey, have invented a new and Improved Sorting-Machine for Peaches, &c., of which the following is a full, clear, and exact description.

My invention relates to that class of machines especially adapted for assorting peaches and other fruit, potatoes and other vegetables, but it is particularly adapted for the assorting of peaches.

The object of the invention is to so construct the machine that the carriers adapted to have movement over the assorting-table may be stopped at any point thereon for the purpose of making sure that all of the fruit or vegetables of a size adapted to pass the table at that point shall find an exit therefrom, and whereby, further, the carriers may be expeditiously and conveniently set in motion, and whereby the motion of the carriers may be rendered substantially continuous, if desired, being, however, preferably intermittent.

A further object of the invention is to provide a means for regulating the feed of the material to the assorting-table and to provide for a basket, crate, or bag-holder which will be so constructed that the receptacle contained on the said holder will initially occupy an inclined position, enabling the fruit to be delivered therein along a side of the receptacle, and, furthermore, to provide a means for causing the holder to gradually assume an upright position as it becomes filled, thereby preventing the bruising of the fruit or vegetables when delivered into the receptacle.

It is a further object of the invention to provide for the adjustment of the chute adapted to supply the material to the baskets or other receptacles from the assorting-table.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
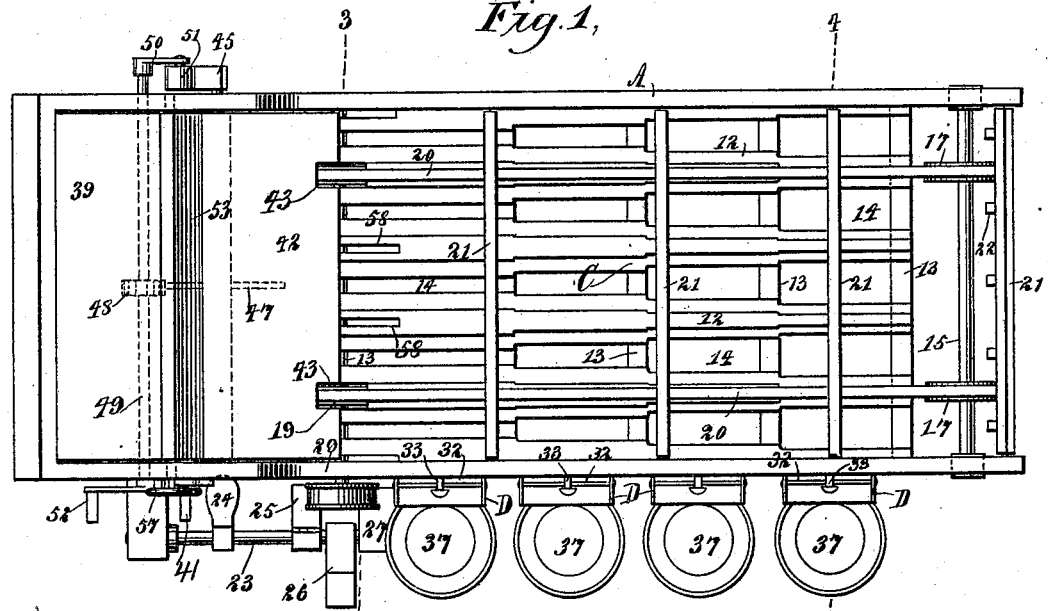
Figure 2:
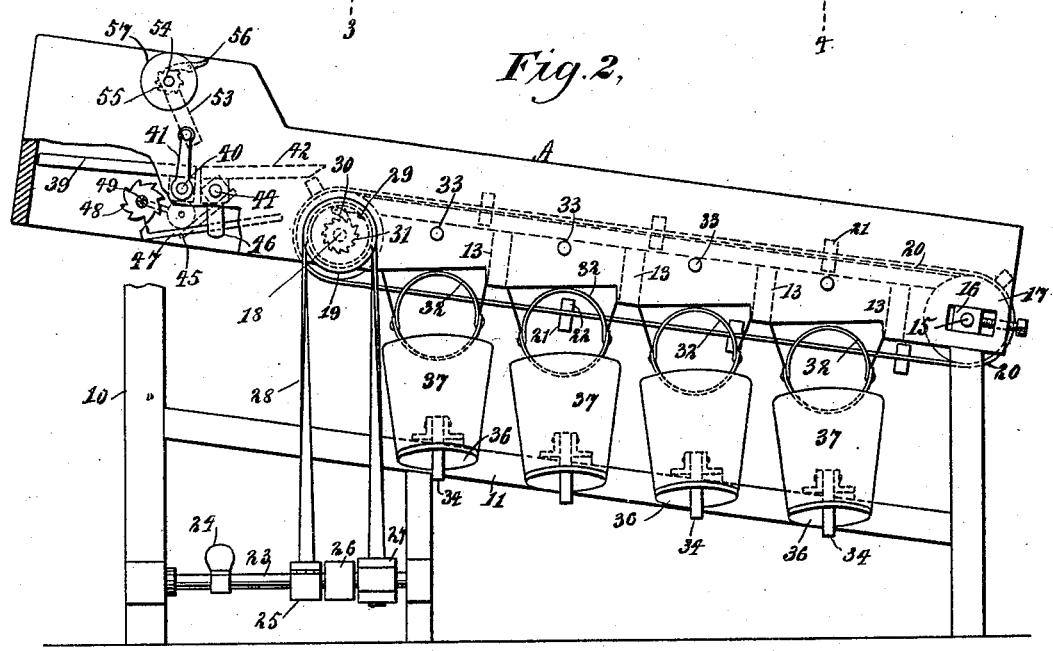
Figure 3:
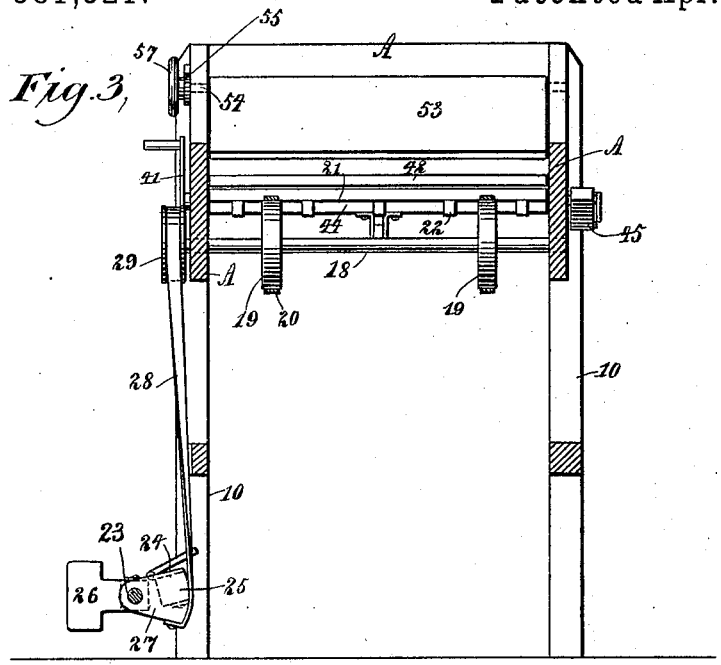
Figure 4:
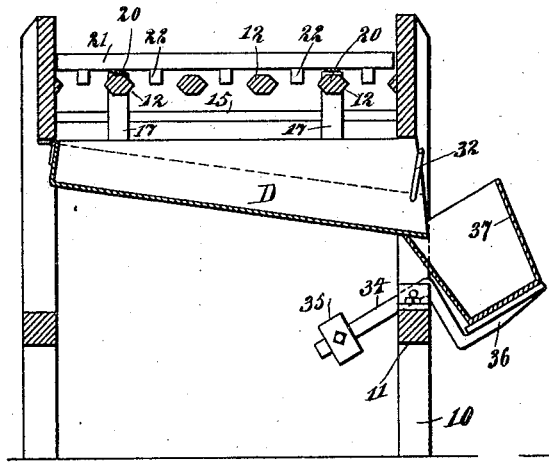
Figure 5:
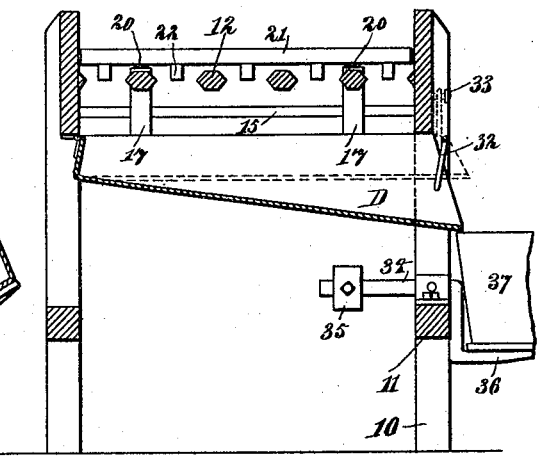
Figure 6:
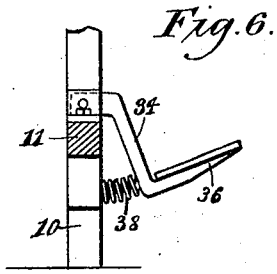

Figure 1 is a plan view of the machine. Fig. 2 is a side elevation, parts being broken away. Fig. 3 is a transverse vertical section taken practically on the line 3 3 of Fig. 1. Fig. 4 is a similar section, taken practically on the line 4 4 of Fig. 1, illustrating the basket or other receptacle in its initial position. Fig. 5 is a section similar to that shown in Fig. 4, illustrating the basket in the position it occupies when filled; and Fig. 6 is a detail view of a modified form of the platform upon which the basket or other receiving-receptacle is to be placed.

In carrying out the invention the body A of the machine is inclined, and consists, primarily, of a frame embracing parallel side pieces and an upper end piece, the said frame having an inclination downward from its receiving end, and the frame is supported by suitable legs 10 or their equivalents, while at preferably the right-hand side of the machine a longitudinal beam 11 is secured, being given an inclination corresponding to that of the body, and the inclined beam 11 is placed a predetermined distance below the said body.

The legs may be connected by any suitable means in addition to the inclined beam 11, and preferably near the upper end of the body an intermediate leg $10^a$ is located, attached to any of the braces employed for the main legs or to other convenient supports.

The assorting-table C virtually extends from a point at or near the lower end of the frame or body to a point at or near the upper end. This assorting-table is stationary and is made up of a series of longitudinal slats 12, being of different widths at intervals in their length, the greatest width of each slat being at the top, and the slats are graduated as to width from this point. All the slats of the assorting-table are of like construction and are in parallel arrangement, being supported upon and attached to cross-bars 13, preferably placed at the ends of the table and intermediate of the ends at the points where the graduation in width of the slats commences and terminates. These slats are preferably given the form shown in cross-section in Figs. 4 and 5, in which it will be observed that their side portions incline downwardly and outwardly from the top to a point near the center and from said point downwardly and inwardly to the bottom, so as to provide for a free or uninterrupted flow of the material to be assorted between the openings 14 intervening the slats, which openings under the graduated form of the slats are of different widths, being therefore adapted for the passage of different sizes of fruit or vegetables at different points on the table. Each transverse series of openings is of the same width.

A shaft 15 is located at the lower end of the frame or body, being journaled in adjustable bearings 16, and the said shaft 15 has secured thereon two pulleys 17, which may be grooved, if desired, one being at each side of the center of the shaft. A second transverse shaft 18 is journaled in the frame or body at the upper end of the assorting-table below the same and at the rear of the uppermost supporting-beam 13. This upper shaft likewise carries two pulleys 19 and is in alinement with the lower shaft 15, and the upper cross bar or beam 13 is provided with recesses to admit of the pulleys 19, extending forwardly or in direction of the lower end of the frame.

Endless belts 20 are passed over the longitudinally-alining pulleys 17 and 19 and likewise longitudinally over the upper face of the assorting-table and below the same. The belts 20 are attached to carriers 21, and these carriers extend transversely over the assorting-table and are arranged at intervals apart corresponding to the length of the different-sized openings 14 in the aforesaid assorting-table, as shown in Fig. 1. Each carrier is provided with a series of preferably angular lugs 22, which when the carriers are above the assorting-table extend in direction of its bottom in substantially a vertical plane within the aforesaid openings 14. The carriers regulate the travel of the material to be assorted over the assorting-table, and the lugs 22 of the carriers serve to keep the openings 14 comparatively unobstructed.

The carriers are driven in the following manner: A shaft 23 is journaled in one of the upper legs 10 and the adjoining or intermediate leg 10$^a$ at the right-hand side of the machine, and the said shaft is provided with a foot-treadle 24, extending inward from the shaft. A weighted arm 25 has a hinged connection with the shaft 23, which hinged weighted arm extends inwardly from the shaft, and a second weighted arm 26 is fixed to the shaft 23 and extends outwardly from said shaft, and between the inner leg 10$^a$ and the outer weighted arm 26 a cam projection 27 is formed upon the inner surface of the said shaft.

A strap 28 is attached to the hinged arm 25, and the said strap is carried upward over a shell or cupped pulley 29, mounted to turn loosely on the upper shaft 18 of the carrier. A dog 30 is pivoted within the said pulley 29, and this dog engages with a ratchet-wheel 31, fast on the aforesaid shaft 18, so that when the treadle 25 is pressed downward by the foot the shaft 23 will be rocked in an inwardly or outwardly direction and the strap 28, which when passed around the pulley 29 is secured to the bottom portion of the eccentric or cam 27, will be moved in a direction to turn the pulley 29 sufficiently to revolve the shaft 18 a portion of a revolution, or one or more revolutions, as may be determined upon, causing the cross or feed bars 21 of the carrier to move a predetermined distance over the assorting-table, holding the fruit in such positions on the said table that the fruit will drop down between the openings in the table into chutes D, located one below each set of graduated openings, the chutes extending, preferably, from the left-hand side of the frame to and beyond the right-hand side. The chutes are hinged at their inner ends to the frame, their outer ends being free, and any of the chutes may be elevated at their outer or discharge ends through the medium of bails 32, which are attached to the chutes and are adapted to be passed over pins or similar projections 33, located on the right-hand side of the frame.

When the treadle 24 is pressed downward, the movement of the belt 28 will raise the inner weight 25, and it may here be remarked that the outer weight 26 is heavier than the inner weight, being of sufficient heft to overcome all of the weight at the inside of the shaft, so that the moment the foot is taken off from the treadle the outer weight 26 will rock the shaft 23 outward and the hinged weight will drop, drawing the end of the belt attached thereto downward, thereby turning the dog carrying the pulley in a rearward direction and bringing the dog in proper position to turn the ratchet-wheel 31 a suitable distance the next time the shaft 23 is operated.

Beneath each of the chutes D an angle-lever 34 is fulcrumed upon the right-hand inclined beam 11, and at the inner horizontal portion of each lever an adjustable weight 35 is located, and preferably integral with the lower end of the outer or vertical member of each lever a horizontal platform 36 is formed, adapted to receive a basket 37 or other receptacle in which the material from the assorting-table is to be delivered. The weight 35 is so placed on these levers that the platforms 36 will be normally held in an upwardly-inclined position, as shown in Fig. 4, and consequently the baskets 37 will be in a like position, and when the chutes D are released from their fastening devices 33 they will drop to an engagement with the mouth portion of the baskets 37, as is also shown in Fig. 4. Therefore the fruit or other material from the chute will enter the basket by passing along its inner inclined side, and the fruit or material in this manner will not be subjected to bruises or injury. As the weight in the baskets 37 increases by reason of said baskets being gradually filled, the baskets and their contents will overcome the resistance of the weights 35, and when the baskets are being topped they will be in the vertical position illustrated in Fig. 5.

Instead of employing weights 35 for the platform-levers a spring 38 may be substituted, in which event, as shown in Fig. 6, the said springs will be located between the inclined beam 11 and the inner face of the vertical portions of the platform-levers, but the said springs 38 may have bearing at their inner ends against other supports than the said inclined beam 11. At the upper end of the frame a receiving-table 39 is located, which table is secured upon a shaft 40, which is shown in Fig. 2, journaled in suitable bearings at the sides of the frame, and a crank-arm 41 is attached to this shaft, by means of which the forward end of the table may be raised or lowered to increase or decrease the feeding capacity of the machine, the shaft being secured to the lower edge of the table.

In front of the feed-receiving table 39 a regulating-table 42 is located, and this regulating-table extends practically over the upper or rear portion of the assorting-table C and is provided at its lower edge, which is inclined, with a series of openings 43 to admit of the passage of the upper pulleys 19 of the carriers. The forward edge of the regulating-table is placed adjacent to the rear edge of the receiving-table 39. The upper portion of the regulating-table is attached to a shaft 44, journaled in the sides of the frame A and provided at its left-hand end with a downwardly and forwardly extending arm 45, while at or about the central portion of the shaft 44 a hanger 46 is formed, within which hanger an intermediate portion of a pawl 47 is secured. This pawl extends forwardly a sufficient distance, as illustrated in Fig. 2, to be engaged by the cross-bars 21 of the carrier-belt, the said cross-bars serving by these means to lift the regulating-table as the cross-bars move upward to make their descent to the rear end of the machine.

The rear end of the dog 47 engages a ratchet-wheel 48, secured upon a shaft 49, journaled in the frame at the rear of the shafts 40 and 44, and at the left-hand end of the shaft 49 an arm 50 is secured, carrying a weight 51, preferably in the nature of a roller, and this weight when in its lower position, as shown in Fig. 2, will engage with the arm 45, holding it at a downward and rearward inclination, and consequently keep the table 42 raised. At the right-hand end of the aforesaid shaft 49 a crank-arm 52 is secured, whereby the weight 51 may be raised to return the regulating-table 42 to its lower position.

In addition to a regulating-table 42 other means are employed to prevent a too rapid feed of the fruit or vegetables from the receiving-table to the assorting-table, and this means consists in a gate 53, which extends from side to side of the frame, being located over the lower end of the receiving-table 39, and the upper end of this gate is secured to a shaft 54, journaled in the frame and provided at one end with an attached ratchet-wheel 55, engaged by a pawl 56; and a hand-wheel 57 or its equivalent is located, preferably, at the same end of the shaft at which the ratchet-wheel 55 is secured, so that by turning the wheel 57 the gate may be brought to a vertical position or to any point between the vertical and horizontal to permit more or less of the fruit to pass from the aforesaid receiving-table.

In the use of the invention the fruit to be sorted is placed upon the receiving-table 39, the gate 53 having been previously adjusted to feed the fruit with approximate accuracy. The operator or attendant now stands grasping with one hand the crank 41 and with the other the crank 52. As operative movement is transmitted to the machine the belt 20 travels over the sorting-table, and when the cleats 21 thereof move upward each cleat will engage the rear end of the pawl 47, causing the forward end of said pawl to be disengaged from the ratchet-wheel 48, whereupon the weight 51 will be freed to fall upon the arm 45 and keep the table 42 raised at its rear edge, such position having been previously given the table concurrently with the upward movement of the rear end of the pawl 47. The weight 51, resting on the arm 45, will maintain the table 42 raised until the shaft 49 is rocked manually through the medium of the crank 52 and in such a manner as to raise the weight 51, whereupon the table 42 will be permitted to gravitate to a lower position, throwing the pawl 47 again into engagement with the ratchet-wheel 48 at the same moment. The position of the table 39 may be also manually regulated by the operator actuating the crank 41. The belt 20 carries the peaches or other fruit over the assorting-table, and from this table the fruit drops into the various chutes D and thence to the buckets 37, all of which has been explained.

The purpose of providing means for intermittently driving the assorting-belts is that should a comparatively great number of small peaches be placed on the table and the belt operated a percentage of the small peaches would overflow from the openings provided therefor in the assorting-table and would fall into the openings for larger fruit. By stopping the operation of the belt, however, this will be avoided and the surplus of peaches may drop through the openings therefor, after which the operation of the belt may be resumed and the remainder of the peaches caused to be distributed by the agitation afforded by the belt.

Having thus described my invention, I claim as new and desire to secure by Letters Patent—

1. In an assorting-machine, an assorting-table, endless belts held to travel around the table, shafts adapted as supports and guides for the belts, carrier-bars located upon said belts and extending transversely of the assorting-table, a rock-shaft, means for moving the same, the said rock-shaft being weighted at opposite sides, the weight upon one side being rigidly secured to the shaft and the weight at the opposite side having a hinged connection with the shaft, the rigid weight being heavier than the hinged weight, a cam-surface located on the said rock-shaft, and a belt operating the said ratchet mechanism, being connected at one end with the hinged weight and at its opposite end with the aforesaid cam-surface, as and for the purpose set forth.

2. In a machine for assorting fruits, vegetables, &c., chutes receiving the articles from the assorting-table, and levers located beneath each of the chutes, each lever being provided with a platform or table adapted to receive a receptacle the said platforms being normally held at an upward inclination with reference to the delivery end of the aforesaid chutes, and adapted to sink to a horizontal position when weighted, as and for the purpose specified.

3. In an assorting-machine, the combination, with an assorting-table, and a carrier held to travel over the same, consisting of endless belts and cross-bars connecting the belts, of an adjustable feed-receiving table, a regulating-table, an arm connected with the regulating-table, a shaft, means by which said shaft may be turned, a ratchet-wheel secured to the said shaft, a weighted arm attached to the shaft having a ratchet-wheel and adapted for engagement with the arm of the regulating-table, and a pawl carried by the regulating-table and adapted for engagement with the aforesaid ratchet-wheel, the pawl being tripped in an upwardly direction by engagement with the cross-bars of the carrier, as and for the purpose specified.

4. In an assorting-machine, the combination with a frame having an assorting-table, of a distributing-belt coöperating with the assorting-table, a regulating-table, a shaft on which the regulating-table is pivotally mounted, an arm carried by said shaft, a pawl also carried by said shaft, a second shaft, a ratchet-disk carried by the said second shaft and coöperating with the pawl, a weight fixed to the second shaft and engaging the plate of the first shaft, and projections on the carrier, the projections being capable of engaging the pawl, substantially as described.

5. In an assorting-machine, the combination with a frame having an assorting-table, a rock-shaft, a receiving-table carried by the rock-shaft, a regulating-table, a rock-shaft to which the regulating-table is affixed, a pawl carried by the rock-shaft of the regulating-table, an arm also carried by said rock-shaft, a third shaft, a ratchet-disk fixed to the third shaft and coöperating with the pawl, a weight carried by the third shaft and coöperating with the arm of the regulating-table shaft, a distributing-carrier for the assorting-table, and projections on the said carrier, such projections being capable of engaging and lifting the pawl, substantially as described.

6. In an assorting-machine, the combination with a frame having an assorting-table, of a distributing-carrier for the said table, projections on the distributing-carrier, a regulating-table, a rock-shaft to which the regulating-table is fixed, the regulating-table being capable of being lifted by the upward movement of the projections, and means for removably holding the regulating-table raised upon the operation of the said projections, substantially as described.

7. In an assorting-machine, the combination with a frame, of a pivotally-mounted regulating-table, means for raising the regulating-table, a pawl in connection with the regulating-table, an arm also in connection with the regulating-table, a rock-shaft, a ratchet-wheel fixed to the rock-shaft and coöperating with the pawl, and a weight carried by the rock-shaft and engaging the arm of the regulating-table, substantially as described.

8. In an assorting-machine, the combination of a pivoted chute receiving the material from the assorting devices, a weighted lever adjacent to the free end of the chute, and a receptacle supported by the lever, the receptacle being normally held inclined and supporting the free end of the chute, and the lever tilting to hold the receptacle horizontally upon the increment of the material in the receptacle, substantially as described.

9. In an assorting-machine having an assorting-table and a distributing-carrier for the assorting-table, the combination of a pivotally-mounted regulating-table, a pawl carried by the table and adapted to be engaged by the distributing-carrier, and a weight normally restrained by the pawl, the weight serving to lift the table upon being released by the pawl, substantially as described.

JOHN P. WILSON.

Witnesses:
J. FRED. ACKER,
JNO. M. RITTER.